US008208953B2

(12) United States Patent
Tanaka

(10) Patent No.: US 8,208,953 B2
(45) Date of Patent: Jun. 26, 2012

(54) MOBILE STATION APPARATUS AND TRANSMISSION POWER CONTROL METHOD

(75) Inventor: Nobuyuki Tanaka, Yokohama (JP)

(73) Assignee: Kyocera Corporation, Kyoto (JP)

( * ) Notice: Subject to any disclaimer, the term of this patent is extended or adjusted under 35 U.S.C. 154(b) by 61 days.

(21) Appl. No.: 12/919,749

(22) PCT Filed: Feb. 25, 2009

(86) PCT No.: PCT/JP2009/053445
§ 371 (c)(1),
(2), (4) Date: Aug. 26, 2010

(87) PCT Pub. No.: WO2009/107676
PCT Pub. Date: Sep. 3, 2009

(65) Prior Publication Data
US 2010/0331038 A1  Dec. 30, 2010

(30) Foreign Application Priority Data
Feb. 27, 2008 (JP) .................................. 2008-046535

(51) Int. Cl.
*H04B 7/00* (2006.01)
(52) U.S. Cl. .............................. 455/522; 455/68; 455/69
(58) Field of Classification Search ............... 455/127.1, 455/522, 67.11, 68–70, 126, 45, 229; 370/318
See application file for complete search history.

(56) References Cited

U.S. PATENT DOCUMENTS

| 7,366,170 B2* | 4/2008 | Umesawa et al. ............. 370/389 |
| 7,773,601 B2 | 8/2010 | Nakajima et al. |
| 7,813,300 B2* | 10/2010 | Takayama et al. ............. 370/254 |
| 7,881,722 B2* | 2/2011 | Gunnarsson et al. ......... 455/450 |
| 7,953,428 B2 | 5/2011 | Shimizu et al. |
| 7,995,484 B2* | 8/2011 | Miyoshi ........................ 370/242 |
| 2002/0159426 A1 | 10/2002 | Kanemoto et al. |
| 2005/0010928 A1* | 1/2005 | Gunji ............................. 719/318 |
| 2006/0094372 A1 | 5/2006 | Ahn et al. |
| 2006/0146804 A1* | 7/2006 | Ozaki ........................... 370/352 |
| 2007/0171913 A1* | 7/2007 | Luo ............................ 370/395.2 |
| 2008/0039118 A1* | 2/2008 | Hyun et al. ................. 455/456.1 |
| 2009/0122768 A1* | 5/2009 | Nakashima et al. .......... 370/338 |

(Continued)

FOREIGN PATENT DOCUMENTS
EP        0 998 158        5/2000

(Continued)

OTHER PUBLICATIONS

International Search Report for PCT/JP2009/053445, mailed on Mar. 24, 2009, 1 page.

*Primary Examiner* — Dominic E Rego
(74) *Attorney, Agent, or Firm* — Morrison & Foerster LLP

(57) ABSTRACT

A mobile station (14) transmits a connection request signal (TCCH) to a base station (12) (S102), and detects whether or not a connection response signal (SCCH) is received from the base station (12) within a predetermined period of time. If the connection response signal (SCCH) is not received within the predetermined period of time, the mobile station (14) decreases the number of subcarriers used for transmitting a radio signal to the base station (12), increases transmission power per subcarrier by an amount of power corresponding to an amount of decrease in the number of subcarriers (S104), and retransmits the connection request signal (TCCH) (S106).

6 Claims, 9 Drawing Sheets

U.S. PATENT DOCUMENTS

2011/0170555 A1 * 7/2011 Miyata .......................... 370/401

FOREIGN PATENT DOCUMENTS

| JP | 2000-134668 | 5/2000 |
| JP | 2005-167963 | 6/2005 |
| JP | 2005-277570 | 10/2005 |
| JP | 2007-096933 | 4/2007 |
| JP | 2007-189373 | 7/2007 |
| JP | 2007-267152 | 10/2007 |
| KR | 2006-0038131 | 5/2006 |

* cited by examiner

BEFORE CHANGE

|← INITIAL NUMBER →|

AFTER CHANGE (AT TIME OF RETRANSMISSION)

AMOUNT OF INCREASE IN POWER

AMOUNT OF DECREASE IN SUBCARRIER

BEFORE CHANGE (BEFORE RECEIVING CONNECTION REQUEST SIGNAL)

←— PASSBAND WIDTH (INITIAL BANDWIDTH) —→

AFTER CHANGE (AFTER RECEIVING CONNECTION REQUEST SIGNAL)

← PASSBAND → WIDTH

MOBILE STATION APPARATUS AND TRANSMISSION POWER CONTROL METHOD

CROSS-REFERENCE TO RELATED APPLICATIONS

This is a U.S. National Phase Application of International Application No. PCT/JP2009/053445 filed Feb. 25, 2009, which claims priority to Japanese Patent Application No. 2008-046535 filed Feb. 27, 2008, the disclosures of which are incorporated herein by reference in their entirety.

TECHNICAL FIELD

The present invention relates to a mobile station apparatus and a transmission power control method, and more particularly, to a multicarrier communication system using a plurality of subcarriers.

BACKGROUND ART

In a mobile communication system, in many cases, a transmission output of a base station is generally larger than that of a mobile station, and an antenna height of the base station is higher than that of the mobile station. Therefore, a range of a radio signal transmitted from the mobile station to the base station (hereinafter, referred to as "uplink budget") has a tendency to be smaller than a range of a radio signal transmitted from the base station to the mobile station (hereinafter, referred to as "downlink budget").

It should be noted that Patent Document 1 discloses a base station apparatus for preventing reduction of frequency usage efficiency and increase of power consumption by allocating fewer subcarriers to a control channel than to a traffic channel.
Patent Document 1: JP 3485860 B2

DISCLOSURE OF THE INVENTION

Problems to be Solved by the Invention

As described above, in a conventional mobile communication system, there is a problem in that a communication area of the base station is narrowed in a case where the uplink budget is smaller than the downlink budget.

The present invention has been made in view of the above-mentioned problem, and an object of the present invention is to provide a mobile station apparatus and a transmission power control method, which are capable of extending a communication area of a base station.

Means for Solving the Problems

In order to solve the above-mentioned problem, the present invention provides a mobile station apparatus for transmitting a radio signal to a base station apparatus by using a plurality of subcarriers, the mobile station apparatus including: connection request transmission means for transmitting a connection request signal to the base station apparatus; connection response detection means for detecting whether or not a connection response signal is received from the base station apparatus within a predetermined period of time after the connection request transmission means transmits the connection request signal; and transmission control means for, if the connection response signal is not received within the predetermined period of time, decreasing a number of subcarriers used for transmitting the radio signal to the base station apparatus, increasing transmission power per subcarrier by an amount of power corresponding to an amount of decrease in the number of subcarriers, and controlling the connection request transmission means to retransmit the connection request signal.

According to the present invention, if the connection response signal is not received from the base station apparatus within the predetermined period of time (if an uplink budget is smaller than a downlink budget) after the connection request signal is transmitted, the mobile station apparatus decreases the number of subcarriers used for transmitting a signal to the base station apparatus, increases the transmission power per subcarrier by the amount of power corresponding to the amount of decrease in the number of subcarriers, and retransmits the connection request signal. Therefore, a range of the radio signal transmitted from the mobile station apparatus to the base station apparatus may be extended without increasing the power consumption of the mobile station apparatus. In other words, the uplink budget is improved, and a communication area of the base station apparatus may be extended.

Further, in an aspect of the present invention, the transmission power per subcarrier is obtained by dividing a predetermined transmission power upper limit value by the number of subcarriers. According to this aspect, the transmission power per subcarrier may be maximized within a range that does not exceed the transmission power upper limit value.

Further, in an aspect of the present invention, the transmission control means further includes means for counting a number of times the connection request signal is retransmitted, and, if the number of times the connection request signal is retransmitted reaches a predetermined number of times, limits retransmission of the connection request signal performed by the connection request transmission means. According to this aspect, the number of times the connection request signal is retransmitted may be limited to an appropriate number of times.

Further, in an aspect of the present invention, the mobile station apparatus transmits the radio signal to the base station apparatus according to an orthogonal frequency division multiplexing system. According to this aspect, in a mobile communication system employing an orthogonal frequency division multiplexing system, the communication area of the base station apparatus may be extended.

Further, the present invention provides a transmission power control method for a mobile station apparatus for transmitting a radio signal to a base station apparatus by using a plurality of subcarriers, the transmission power control method including: transmitting a connection request signal to the base station apparatus; detecting whether or not a connection response signal is received from the base station apparatus within a predetermined period of time after the connection request signal is transmitted; if the connection response signal is not received within the predetermined period of time, decreasing a number of subcarriers used for transmitting the radio signal to the base station apparatus, and increasing transmission power per subcarrier by an amount of power corresponding to an amount of decrease in the number of subcarriers; and retransmitting the connection request signal.

BEST MODE FOR CARRYING OUT THE INVENTION

A detailed description is made below of an embodiment of the present invention with reference to the drawings.

Figure 1:
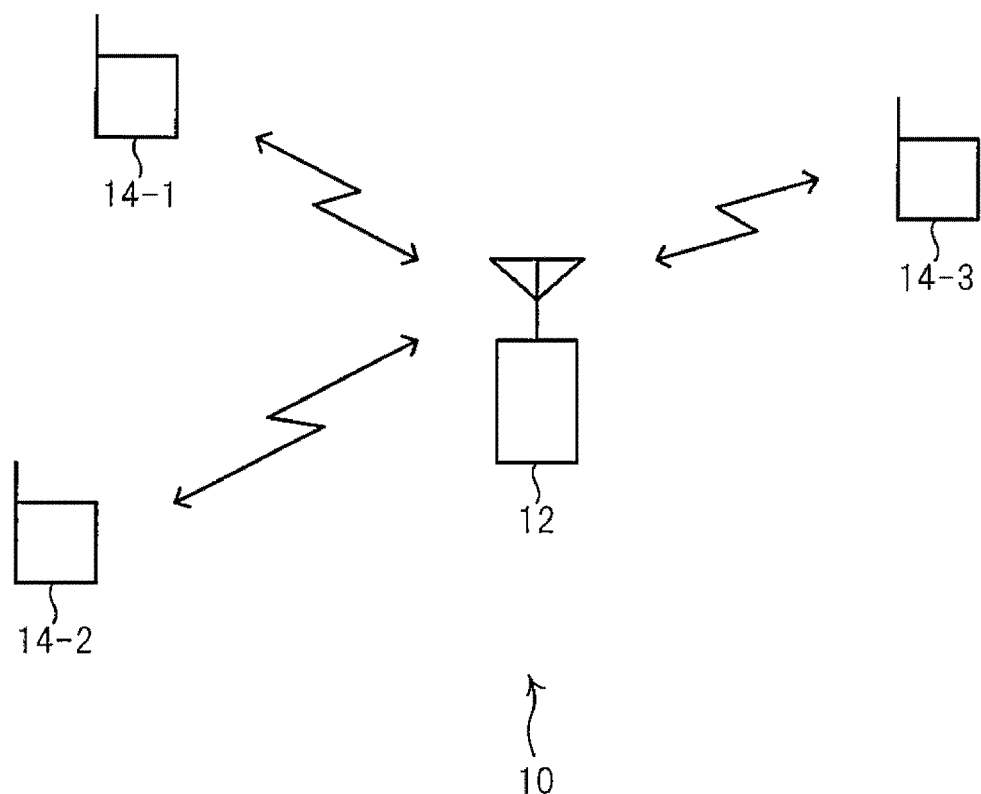
FIG. 1 A diagram illustrating an entire configuration of a mobile communication system according to an embodiment of the present invention.

FIG. 1 is a diagram illustrating an entire configuration of a mobile communication system 10 according to the embodiment of the present invention. As illustrated in FIG. 1, the mobile communication system 10 includes a base station 12 and a plurality of mobile stations 14 (only three mobile stations are illustrated in FIG. 1).

The base station 12 performs multiplex communication with the plurality of mobile stations 14 according to a time division multiple access/time division duplex (TDMA/TDD) system and an orthogonal frequency division multiple access (OFDMA) system.

The mobile station 14 is, for example, a portable mobile phone, a personal digital assistant, or a communication card. The mobile station 14 has a transmission power upper limit value defined therefor, and is not allowed to increase transmission power beyond the upper limit value even in a case of an insufficient uplink budget.

Figure 9:
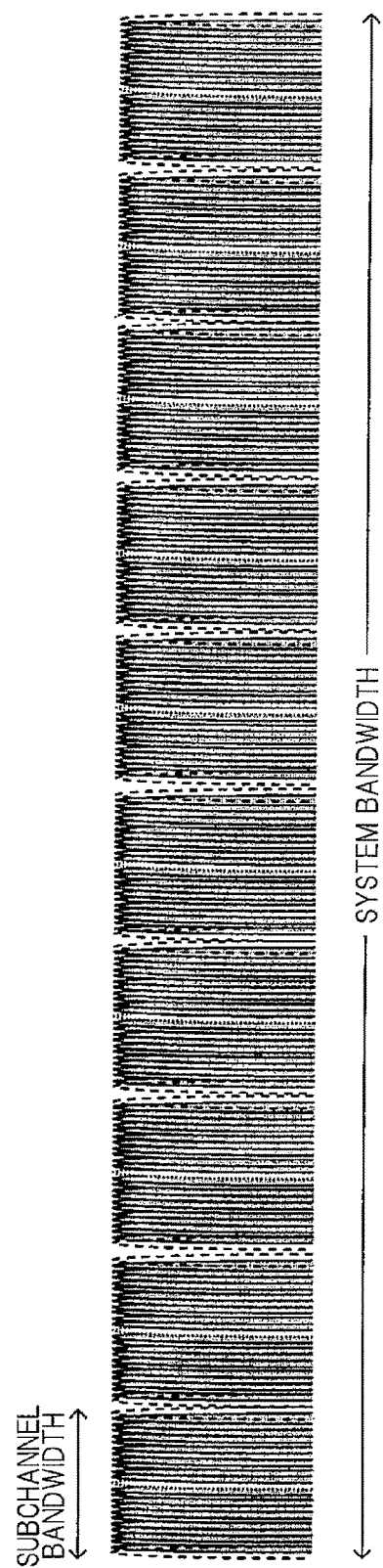
FIG. 9 A diagram illustrating a system bandwidth and a subchannel bandwidth in a mobile communication system employing an OFDMA system.

The mobile communication system 10 has a common channel (CCH) and individual channels (ICH) defined therefor as radio channels for performing radio communication between the base station 12 and the plurality of mobile stations 14. The CCH is used in common between the base station 12 and the plurality of mobile stations 14. The ICHs are used between the base station 12 and the respective mobile stations 14. Each of the radio channels is constituted by one or a plurality of subchannels composed of a plurality of subcarriers orthogonal to each other (see FIG. 9). In this regard, the maximum number of subcarriers constituting one radio channel is limited. It should be noted that, if one radio channel is constituted by two or more subchannels, the two or more subchannels may be adjacent to or apart from each other. Further, the plurality of subcarriers constituting one subchannel may be adjacent to or apart from each other.

The CCH and the ICH have a plurality of function channels defined therefor, which are used in the respective phases of communication. For example, for the CCH, a paging channel (PCH), a timing correct channel (TCCH), a signaling control channel (SCCH), and the like are defined. For the ICH, an individual control channel (ICCH), a traffic channel (TCH), and the like are defined.

Figure 2:
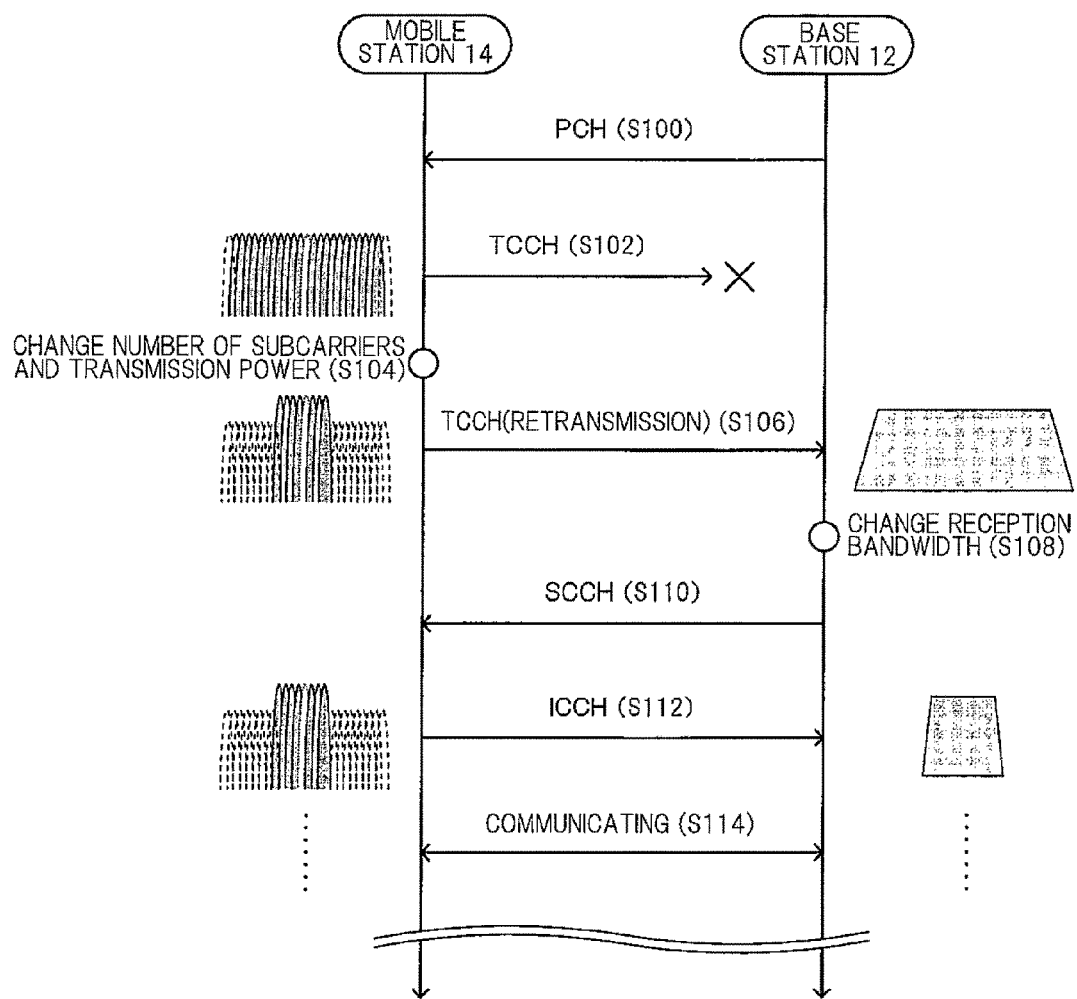
FIG. 2 A sequence diagram illustrating link channel establishment processing (at a time of an incoming call) according to the embodiment of the present invention.

FIG. 2 is a sequence diagram illustrating link channel establishment processing at a time of an incoming call in the mobile communication system 10. As illustrated in FIG. 2, at the time of the incoming call, the base station 12 concurrently transmits call signals notifying the incoming call to the mobile stations 14 that exist in its communication area on the PCH (S100). On the other hand, each of the mobile stations 14, which has received the call signal addressed thereto, transmits a connection request signal for requesting link channel establishment to the base station 12 on the TCCH (S102).

At this time, if the uplink budget of the mobile station 14 is smaller than a distance between the mobile station 14 and the base station 12, the connection request signal transmitted in S102 does not arrive at the base station 12. In this case, the mobile station 14 decreases the number of subcarriers and increases transmission power per subcarrier (S104) to retransmit the connection request signal (S106). This facilitates the arrival of the connection request signal transmitted from the mobile station 14 at the base station 12.

When the connection request signal retransmitted in S106 arrives at the base station 12, the base station 12 detects the number of subcarriers of the TCCH, which have been used for transmitting the connection request signal, and changes a reception bandwidth according to the number of the detected subcarriers (S108). In this case, the reception bandwidth of the base station 12 in S106 is wide with respect to the number of the detected subcarriers of the TCCH, and hence the base station 12 narrows the reception bandwidth to be applied to the subsequent reception. After that, the base station 12 determines the ICH that is to be allocated to the mobile station 14 and transmits a connection response signal containing the determined ICH to the mobile station 14 on the SCCH (S110). When the mobile station 14 receives the connection response signal from the base station 12, the link channel establishment between the base station 12 and the mobile station 14 is completed. Then, the mobile station 14 transmits, to the base station 12, an allocation confirmation signal for confirming the allocation of the ICH by using the ICH (ICCH) (S112), to thereby start the radio communication using the ICH between the mobile station 14 and the base station 12 (S114).

In the mobile communication system 10, transmission conditions (number of the subcarriers and transmission power per subcarrier) according to the connection request signal arriving at the base station 12 in S106 are also applied to radio transmission performed by the mobile station 14 in S112 and thereafter. Therefore, the uplink budget is improved. Further, the reception bandwidth of the base station 12, which is narrowed in S108, is maintained thereafter, and hence the base station 12 has improved reception quality of a signal. In this manner, the mobile communication system 10 realizes extension of the communication area of the base station 12.

A detailed description is made below of configurations of the mobile station 14 and the base station 12 for realizing the above-mentioned processing.

Figure 3:
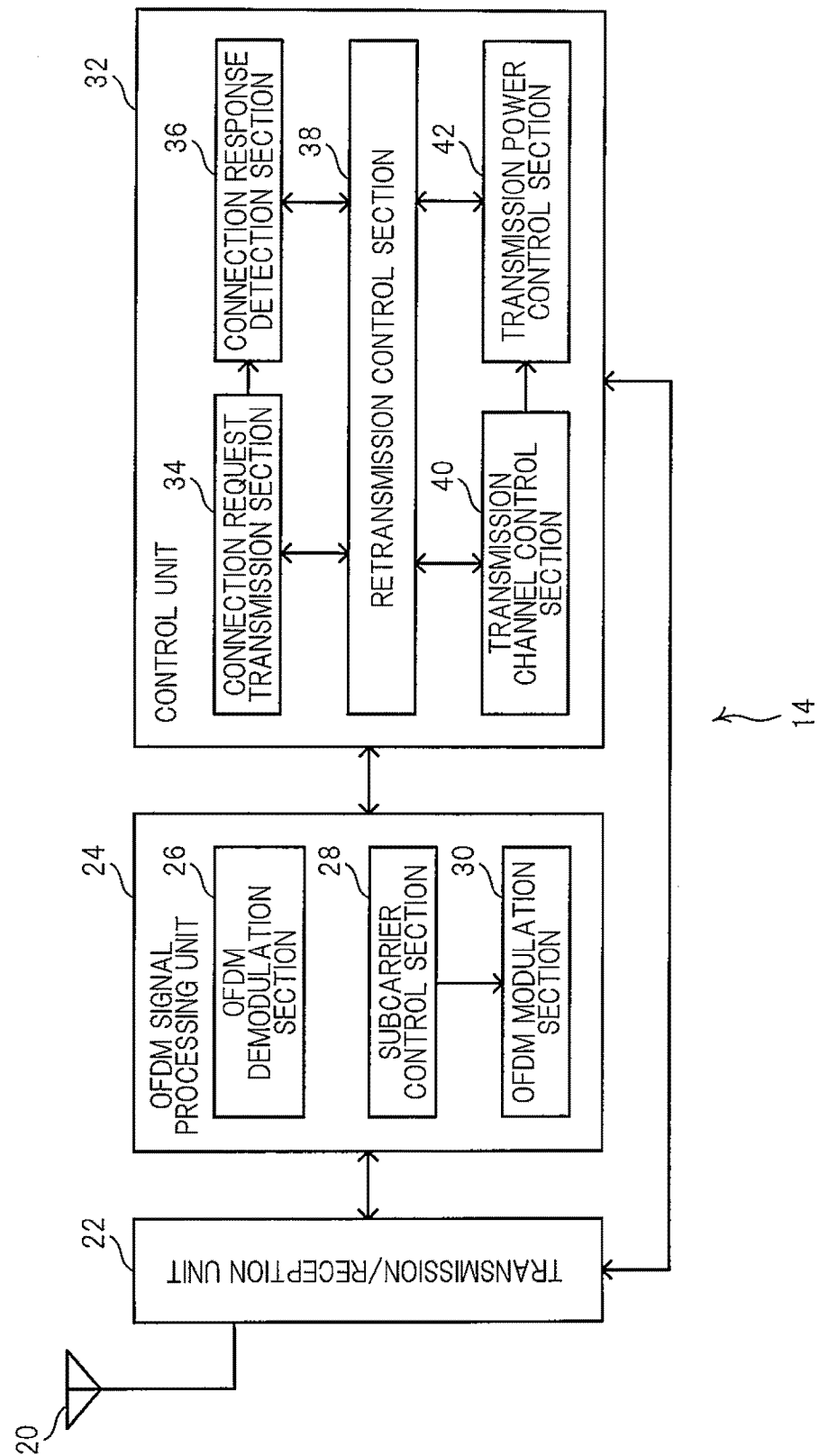
FIG. 3 A functional block diagram of a mobile station according to the embodiment of the present invention.

FIG. 3 is a functional block diagram of the mobile station 14. As illustrated in FIG. 3, the mobile station 14 includes an antenna 20, a transmission/reception unit 22, an OFDM signal processing unit 24 (OFDM demodulation section 26, subcarrier control section 28, and OFDM modulation section 30), and a control unit 32 (connection request transmission section 34, connection response detection section 36, retransmission control section 38, transmission channel control section 40, and transmission power control section 42).

The antenna 20 receives a radio signal and outputs the received radio signal to the transmission/reception unit 22. Further, the antenna 20 radiates, to the base station 12, a radio signal supplied from the transmission/reception unit 22. Transmission and reception of the radio signal are switched in a time-division manner based on an instruction issued by the transmission/reception unit 22.

The transmission/reception unit 22 includes a low noise amplifier, a power amplifier, a local oscillator, a mixer, and a filter. The radio signal input from the antenna 20 is amplified by the low noise amplifier, downconverted into an intermediate frequency signal, and then output to the OFDM signal processing unit 24. Further, an intermediate frequency signal input from the OFDM signal processing unit 24 is upconverted into a radio signal, amplified to a transmission power level by the power amplifier, and then supplied to the antenna 20. It should be noted that the power amplifier performs amplification so that transmission power of each of the subcarriers contained in the radio signal becomes transmission power per subcarrier notified from the transmission power control section 42 described later.

The OFDM signal processing unit 24 functionally includes the OFDM demodulation section 26, the subcarrier control section 28, and the OFDM modulation section 30.

The OFDM demodulation section 26 includes an A/D converter, a fast Fourier transform (FFT) portion, and a symbol demapper. The intermediate frequency signal input from the transmission/reception unit 22 to the OFDM demodulation section 26 is converted into a digital signal by the A/D converter, and converted into subcarrier components of complex symbol sequence by the FFT portion executing a Fourier transform. The subcarrier components of complex symbol sequence are converted into a symbol sequence through parallel-serial conversion, and decoded into a data bit sequence (received data) according to a modulation scheme of symbols by the symbol demapper before being output to the control unit 32.

The subcarrier control section 28 controls the OFDM modulation section 30 so that the number of subcarriers used for transmitting the radio signal is equal to the number of subcarriers notified by the transmission channel control section 40 described later.

The OFDM modulation section 30 includes a D/A converter, an inverse fast Fourier transform (IFFT) portion, and a symbol mapper. A data bit sequence (transmission data) input from the control unit 32 to the OFDM modulation section 30 is converted into a complex symbol sequence by the symbol mapper, and then divided into subcarrier components through serial-parallel conversion. This serial-parallel conversion processing is controlled by the subcarrier control section 28 so that the number of subcarriers of complex symbol sequence is equal to the number of subcarriers notified by the transmission channel control section 40. The subcarrier components of complex symbol sequence thus obtained are converted into OFDM symbol sample values by inverse Fourier transform executed by the IFFT portion. The OFDM symbol sample values are converted into an analog signal by the D/A converter, and then output to the transmission/reception unit 22 as a baseband OFDM signal (modulation signal). This baseband OFDM signal is constituted by subcarriers, the number of which is equal to the number of subcarriers notified by the transmission channel control section 40.

It should be noted that the subcarrier control section 28, the FFT portion, the IFFT portion, the symbol mapper, and the symbol demapper are each constituted by, for example, a digital signal processor (DSP).

The control unit 32 is constituted by, for example, a CPU, a memory, and the like, and has functions of controlling the components of the mobile station 14 by the CPU executing programs stored in the memory. In particular, the control unit 32 functionally includes the connection request transmission section 34, the connection response detection section 36, the retransmission control section 38, the transmission channel control section 40, and the transmission power control section 42.

The connection request transmission section 34 transmits the connection request signal to the base station 12 (outputs a data bit sequence corresponding to the connection request signal to the OFDM modulation section 30) when the mobile station 14 starts radio communication with the base station 12. Further, the connection request transmission section 34 retransmits the connection request signal in response to an instruction issued by the retransmission control section 38 described later.

The connection response detection section 36 detects whether or not the connection response signal is received from the base station 12 within a predetermined period of time after the connection request transmission section 34 transmits the connection request signal (whether or not a data bit sequence corresponding to the connection response signal is input from the OFDM demodulation section 26 to the control unit 32). For example, the connection response detection section 36 may start timer counting at a timing at which the connection request signal is transmitted, and judge whether or not the connection response signal is received before a timer count value reaches a predetermined value.

If the connection response signal is not received within the predetermined period of time after the connection request signal is transmitted, the retransmission control section 38 instruct the transmission channel control section 40 to decrease the number of the subcarriers used for transmitting the radio signal to the base station 12, and instructs the transmission power control section 42 to increase the transmission power per subcarrier by an amount of power corresponding to an amount of decrease in the number of the subcarriers. Further, the retransmission control section 38 instructs the connection request transmission section 34 to retransmit the connection request signal. It should be noted that the retransmission control section 38 may count the number of times the connection request transmission section 34 retransmits the connection request signal, and limit retransmission of the connection request signal when the number of times the retransmssion is performed reaches a predetermined number of times.

The transmission channel control section 40 controls subchannels (transmission channel) used for transmitting the radio signal to the base station 12, such as TCCHs or ICCHs. In this embodiment, the number of subcarriers constituting a transmission channel is determined in a link channel establishment phase.

Figure 5A:
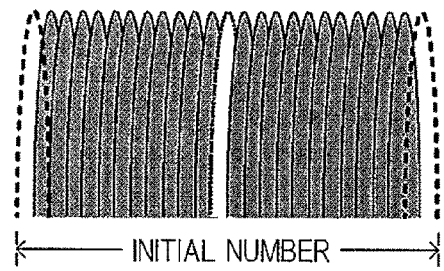
FIG. 5A A diagram illustrating the number of subcarriers and transmission power per subcarrier before change.

First, the transmission channel control section 40 sets the number of subcarriers of the TCCH used for transmitting the connection request signal to an initial number determined in the mobile communication system 10 (see FIG. 5A). Then, if the link channel establishment is completed without retransmitting the connection request signal, the initial number of subcarriers are used for subsequently transmitting the radio signals (transmission through the ICCH or the TCH or the like).

Figure 5B:
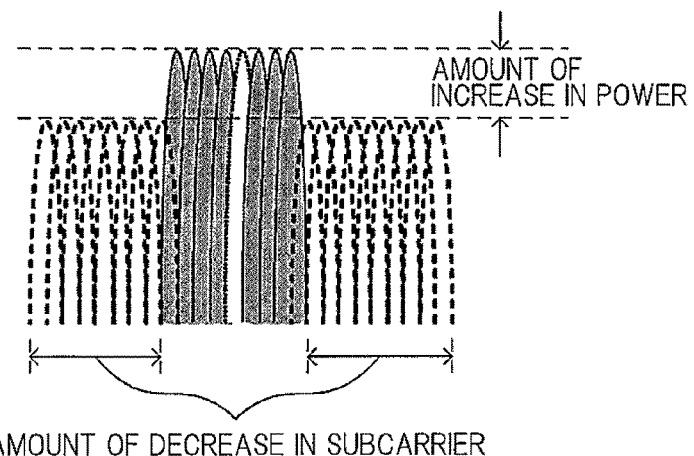
FIG. 5B A diagram illustrating the number of subcarriers and the transmission power per subcarrier after change.

On the other hand, if the connection request signal is retransmitted in the link channel establishment phase, the transmission channel control section 40 sets a number that is smaller by one or more than the initial number as the new number of subcarriers of the TCCH in response to an instruction issued by the retransmission control section 38, and notifies of the new number the subcarrier control section 28 and the transmission power control section 42 (see FIG. 5B). Then, also in a case where the connection request signal is retransmitted twice or more, the transmission channel control section 40 sets a number that is smaller by one or more than the number of subcarriers used for previous transmission of the connection request signal as the new number of subcarriers of the TCCH. In this way, the transmission channel control section 40 gradually decreases the number of subcarriers of the TCCH from the initial number according to the number of times the connection request signal is transmitted until the connection response signal is received from the base station 12. If the connection response signal is received from the base station 12, the same number of subcarriers as that at the timing of the reception are used for subsequently transmitting the radio signals.

The transmission power control section 42 controls the transmission power used when the radio signal is transmitted to the base station 12. In particular, when the number of subcarriers of the TCCH is decreased in the link channel establishment phase, the transmission power control section 42 determines new transmission power so that the transmission power per subcarrier is increased by the amount of power corresponding to the amount of decrease in the number of the subcarriers (see FIG. 5B), and notifies the transmission/reception unit 22 of the determined transmission power per subcarrier.

It should be noted that the transmission power control section 42 may set, as new transmission power per subcarrier, a value obtained by dividing a transmission power upper limit value for the mobile station 14 by the number of subcarriers notified by the transmission channel control section 40. With this configuration, the transmission power per subcarrier may be maximized within a range that does not exceed the transmission power upper limit value.

In this way, if the connection response signal is not received from the base station 12 within the predetermined period of time after the connection request signal is transmitted, the mobile station 14 decreases the number of subcarriers constituting the transmission channel and increases the transmission power per subcarrier by the amount of power corresponding to the amount of decrease in number to retransmit the connection request signal. Therefore, a range of the radio signal transmitted from the mobile station 14 to the base station 12 may be extended without increasing the power consumption of the mobile station 14.

Figure 4:
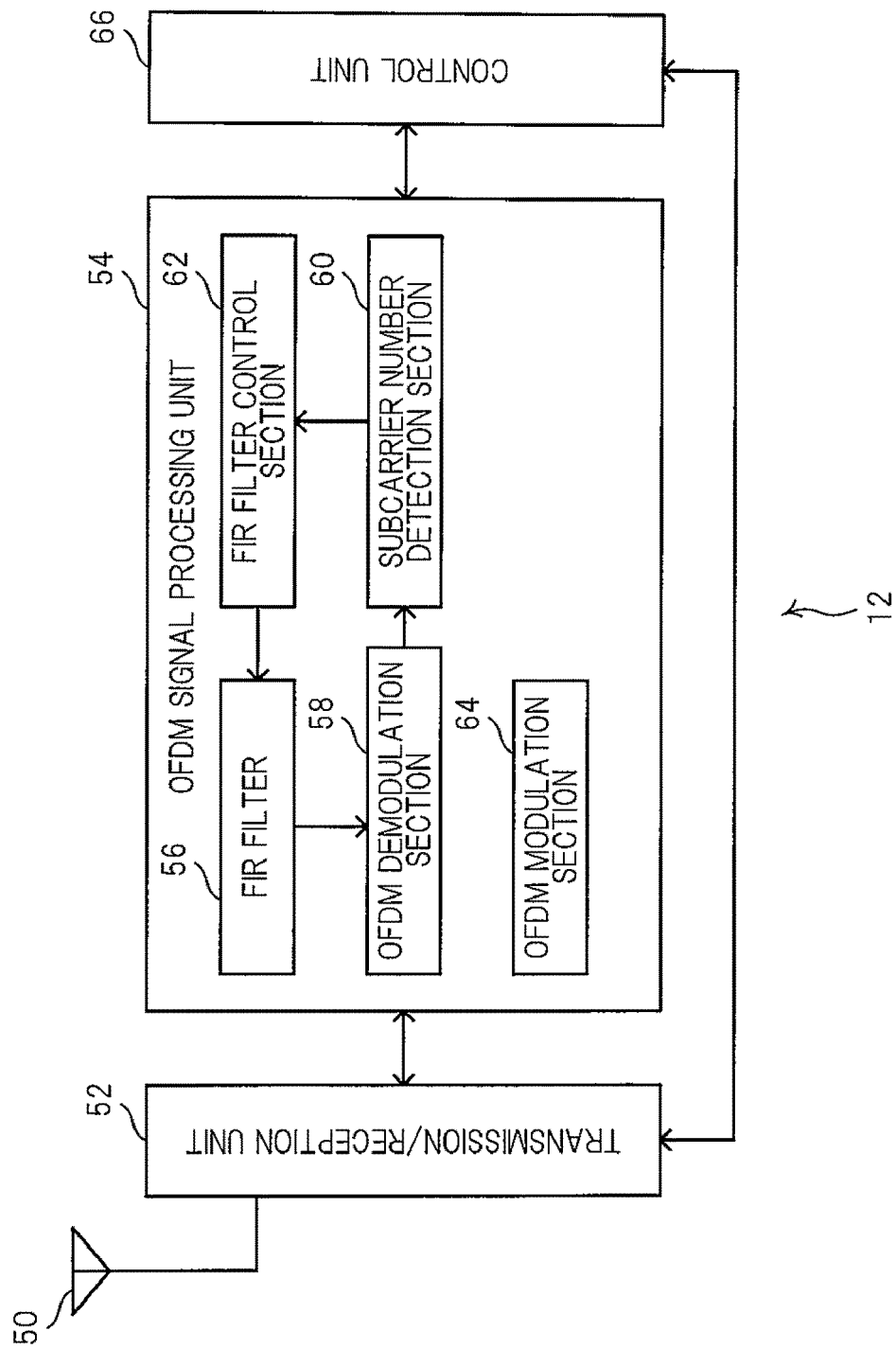
FIG. 4 A functional block diagram of a base station according to the embodiment of the present invention.

FIG. 4 is a functional block diagram of the base station 12. As illustrated in FIG. 4, the base station 12 includes an antenna 50, a transmission/reception unit 52, an OFDM signal processing unit 54 (finite impulse response (FIR) filter 56, OFDM demodulation section 58, subcarrier number detection section 60, FIR filter control section 62, OFDM modulation section 64), and the control unit 66.

The antenna 50 receives a radio signal and outputs the received radio signal to the transmission/reception unit 52. Further, the antenna 50 radiates, to the mobile station 14, a radio signal supplied from the transmission/reception unit 52. Transmission and reception of the radio signal are switched in a time-division manner based on an instruction issued by the transmission/reception unit 52.

The transmission/reception unit 52 includes a low noise amplifier, a power amplifier, a local oscillator, a mixer, and a filter. The radio signal input from the antenna 50 is amplified by the low noise amplifier, downconverted into an intermediate frequency signal, and then output to the OFDM signal processing unit 54. Further, an intermediate frequency signal input from the OFDM signal processing unit 54 is upconverted into a radio signal, amplified to a transmission power level by the power amplifier, and then supplied to the antenna 50.

The OFDM signal processing unit 54 functionally includes the FIR filter 56, the OFDM demodulation section 58, the subcarrier number detection section 60, the FIR filter control section 62, and the OFDM modulation section 64.

The FIR filter 56 is a bandpass filter having a passband with a variable width which accommodates an upper limit number of subcarriers constituting a subchannel. The FIR filter 56 outputs, of the intermediate frequency signals input from the transmission/reception unit 52, only signals falling within the passband to the OFDM demodulation section 58. The passband of the FIR filter 56 is controlled by the FIR filter control section 62 described later so that a signal of the mobile station 14 is separated from a received signal. However, the passband width of the FIR filter 56 is maintained to a bandwidth (hereinafter, referred to as "initial bandwidth") corresponding to the initial number of subcarriers until the connection request signal is received from the mobile station 14.

The OFDM demodulation section 58 includes an A/D converter, an FFT portion, and a symbol demapper. The intermediate frequency signal input from the FIR filter 56 is converted into a digital signal by the A/D converter, and converted into subcarrier components of complex symbol sequence by the FFT portion executing a Fourier transform. The subcarrier components of complex symbol sequence are converted into a symbol sequence through parallel-serial conversion, and decoded into a data bit sequence (received data) according to a modulation scheme of symbols by the symbol demapper before being output to the control unit 66.

The subcarrier number detection section 60 detects, based on the received signal, the number of the subcarriers of the TCCH used for transmitting the connection request signal. For example, the number of subcarrier components that are included in the subcarrier components of complex symbol sequence of a first radio signal (connection request signal), which are obtained by the OFDM demodulation section 58 when the connection request signal is received from the mobile station 14 on the TCCH, and have signal intensities equal to or larger than a predetermined value may be detected as the number of subcarriers of the TCCH.

Figure 6A:
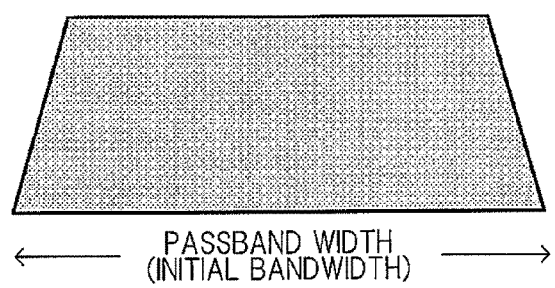
FIG. 6A A diagram illustrating a passband width of a finite impulse response (FIR) filter before change.

The FIR filter control section 62 changes a voltage applied to a control terminal of the FIR filter 56, to thereby control the passband width of the FIR filter 56. As described above, the FIR filter control section 62 maintains the passband width of the FIR filter 56 to the initial bandwidth until the connection request signal is received from the mobile station 14 (see FIG. 6A).

Figure 6B:
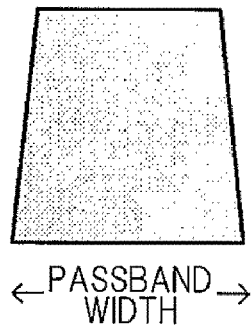
FIG. 6B A diagram illustrating the passband width of the FIR filter after change.

When the connection request signal is received from the mobile station 14 on the TCCH, the FIR filter control section 62 changes the passband width of the FIR filter 56 according to the number of subcarriers detected by the subcarrier number detection section 60. For example, if the received connection request signal is transmitted by using the initial number of subcarriers illustrated in FIG. 5A, the FIR filter control section 62 maintains the passband width of the FIR filter 56 without change (see FIG. 6A). On the other hand, if the received connection request signal is transmitted by using the subcarriers illustrated in FIG. 5B, the FIR filter control section 62 narrows the passband width of the FIR filter 56 to a passband width illustrated in FIG. 6B, and applies this passband width to signals subsequently received from the mobile station 14. With this configuration, a ratio of noise contained in a signal of the mobile station 14, which passes the FIR filter 56, is decreased and reception quality of the signal (for example, signal-to-noise ratio) is improved.

Next, a description is given of operations of the mobile station 14 and the base station 12.

Figure 7:
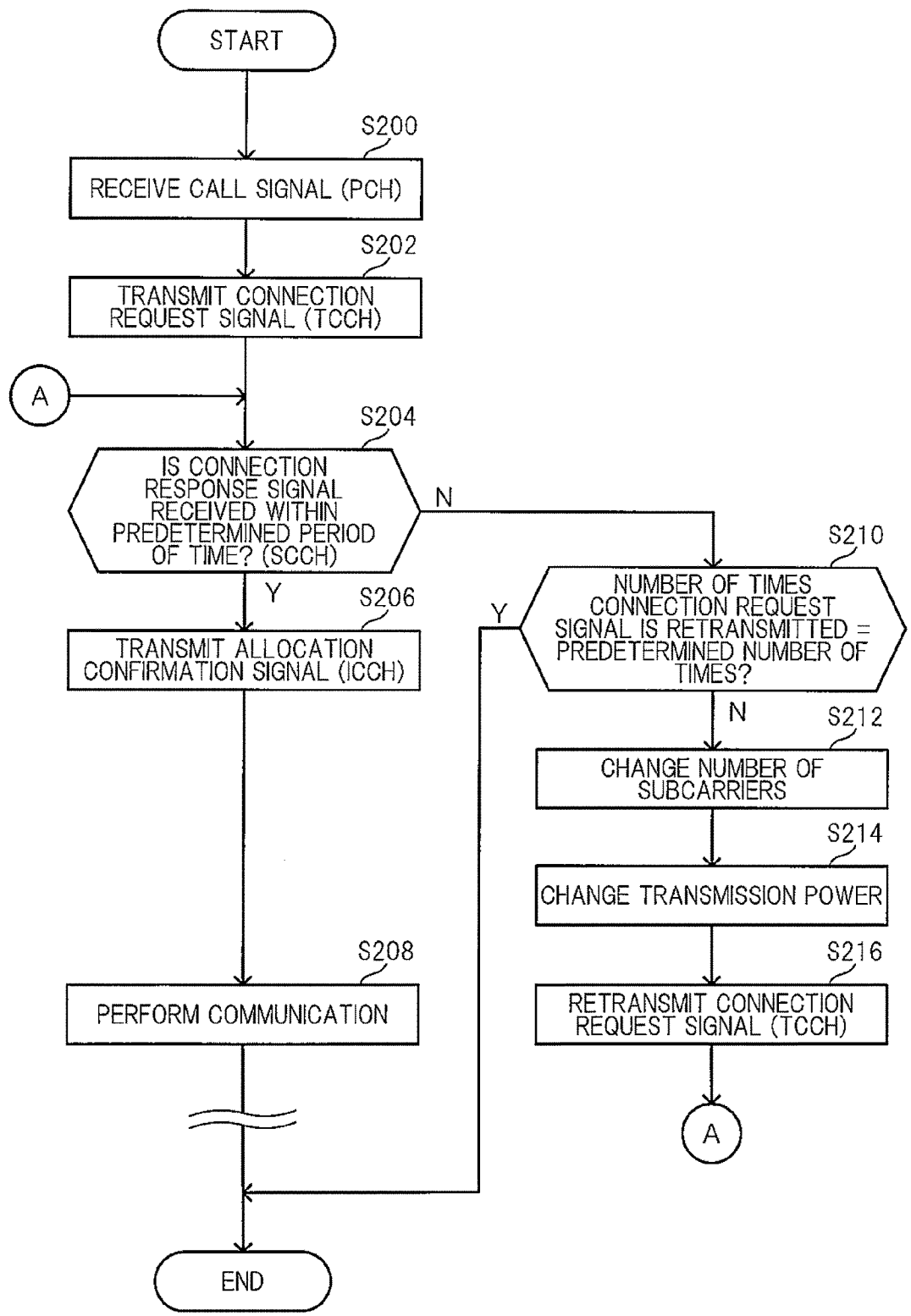
FIG. 7 A flowchart illustrating the link channel establishment processing (at the time of the incoming call), which is executed by the mobile station, according to the embodiment of the present invention.

FIG. 7 is a flowchart illustrating the link channel establishment processing at the time of the incoming call, which is executed by the mobile station 14. As illustrated in FIG. 7, when the mobile station 14 receives the call signal addressed thereto from the base station 12 on the PCH (S200), the mobile station 14 transmits the connection request signal to the base station 12 through the TCCH (S202). After that, the mobile station 14 monitors whether or not the connection response signal is received from the base station 12 on the SCCH (S204). If the mobile station 14 receives the connection response signal within the predetermined period of time after the mobile station 14 transmits the connection request signal (S204: Y), the link channel establishment with respect to the base station 12 is completed. In this case, the mobile station 14 transmits the allocation confirmation signal to the base station 12 by using the ICH (ICCH) notified in the connection response signal (S206), to thereby start communication with the base station 12 (S208).

On the other hand, if the mobile station 14 does not receive the connection response signal within the predetermined period of time after the mobile station 14 transmits the connection request signal in S202, except for a case where the number of times the connection request signal is retransmitted reaches the predetermined number of times (S210: Y), the mobile station 14 decreases the number of the subcarriers of the transmission channel used for the TCCH and the subsequent communication by one or more (S212), and increases the transmission power per subcarrier by the amount of power corresponding to the amount of decrease in the number of the subcarriers (S214). Then, the mobile station 14 retransmits the connection request signal to the base station 12 through the TCCH (S216) to execute the processing of S204 and the subsequent processing.

Figure 8:
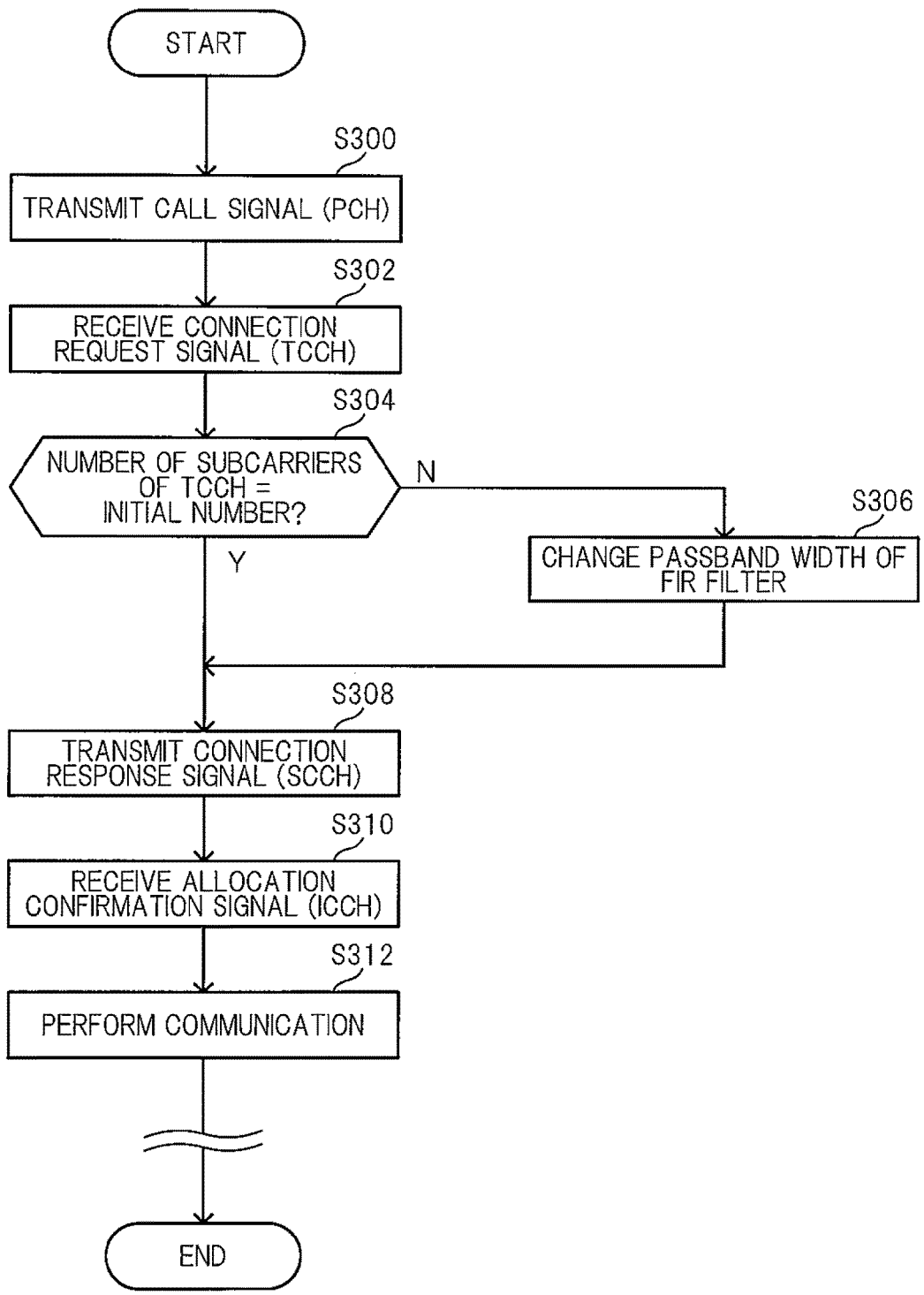
FIG. 8 A flowchart illustrating the link channel establishment processing (at the time of the incoming call), which is executed by the base station, according to the embodiment of the present invention.

FIG. 8 is a flowchart illustrating the link channel establishment processing at the time of the incoming call, which is executed by the base station 12. As illustrated in FIG. 8, first, the base station 12 concurrently transmits call signals to the mobile stations 14 that exist in its communication area on the PCH (S300). After receiving the connection request signal from the mobile station 14 corresponding to the call signal through the TCCH (S302), the base station 12 detects the number of subcarriers constituting the TCCH, and judges whether or not the number of subcarriers is equal to the initial number determined in the mobile communication system 10 (S304).

Here, if the detected number of subcarriers is equal to the initial number (S304: Y), the base station 12 uses the SCCH to transmit the connection response signal containing the ICH to the mobile station 14 without changing the passband width of the FIR filter 56 (S308). On the other hand, if the number of subcarriers detected in S304 is smaller than the initial number (S304: N), the base station 12 narrows the passband width of the FIR filter 56 according to the detected number of subcarriers (S306), and then transmits the connection response signal containing the ICH (S308). After that, when the base station 12 receives the allocation confirmation signal from the mobile station 14 on the ICH (ICCH) (S310), the base station 12 starts the communication with the mobile station 14 (S312).

According to the mobile communication system 10 described above, the range (uplink budget) of the radio signal transmitted from the mobile station 14 to the base station 12 is improved, and the communication area of the base station 12 may be extended. Further, the base station 12 has the improved reception quality of a signal, and hence the communication area of the base station 12 may be further extended.

It should be noted that the present invention is not limited to the above-mentioned embodiment. For example, the present invention is not limited to a mobile communication system employing both a TDMA/TDD system and an OFDMA system, and may be widely applied to communication systems employing a multicarrier communication system.

Further, although not particularly referred to in the above description of the embodiment, the number of subcarriers in a downlink direction (direction from the base station 12 to the mobile station 14) may be constant or variable.

The invention claimed is:

1. A mobile station apparatus for transmitting a radio signal to a base station apparatus by using a plurality of subcarriers, comprising:
   connection request transmission means for transmitting a connection request signal to the base station apparatus;
   connection response detection means for detecting whether or not a connection response signal is received from the base station apparatus within a predetermined period of time after the connection request transmission means transmits the connection request signal; and
   transmission control means for, if the connection response signal is not received within the predetermined period of time, decreasing a number of subcarriers used for transmitting the radio signal to the base station apparatus, increasing transmission power per subcarrier by an amount of power corresponding to an amount of decrease in the number of subcarriers, and controlling the connection request transmission means to retransmit the connection request signal.

2. The mobile station apparatus according to claim 1, wherein the transmission power per subcarrier is obtained by dividing a predetermined transmission power upper limit value by the number of subcarriers.

3. The mobile station apparatus according to claim 1, wherein the transmission control means comprises means for counting a number of times the connection request signal is retransmitted, and, if the number of times the connection request signal is retransmitted reaches a predetermined number of times, limits retransmission of the connection request signal performed by the connection request transmission means.

4. The mobile station apparatus according to claim 1, wherein the mobile station apparatus transmits the radio signal to the base station apparatus according to an orthogonal frequency division multiplexing system.

5. A transmission power control method for a mobile station apparatus for transmitting a radio signal to a base station apparatus by using a plurality of subcarriers, comprising:
   transmitting a connection request signal to the base station apparatus;
   detecting whether or not a connection response signal is received from the base station apparatus within a predetermined period of time after the connection request signal is transmitted;
   if the connection response signal is not received within the predetermined period of time, decreasing a number of subcarriers used for transmitting the radio signal to the base station apparatus, and increasing transmission power per subcarrier by an amount of power corresponding to an amount of decrease in the number of subcarriers; and retransmitting the connection request signal.

6. The mobile station apparatus according to claim 2, wherein the transmission control means comprises means for counting a number of times the connection request signal is retransmitted, and, if the number of times the connection request signal is retransmitted reaches a predetermined number of times, limits retransmission of the connection request signal performed by the connection request transmission means.

* * * * *